3,321,375
SUBSTANTIALLY ISOTROPIC GRAPHITIZED
BODIES USED IN NUCLEAR REACTORS
Samuel W. Martin, deceased, late of Oak Park, Ill., by Beverly Martin, executrix, Oak Park, Ill., and Frederick L. Shea, Jr., Johnson City, Tenn., and Leslie H. Juel, Lewiston, N.Y., assignors to Great Lakes Carbon Corporation, New York, N.Y., a corporation of Delaware
No Drawing. Filed Mar. 3, 1964, Ser. No. 349,794
5 Claims. (Cl. 176—41)

This application is a continuation-in-part of our copending application Ser. No. 266,088 filed Mar. 18, 1963, now U.S. Patent No. 3,245,880.

This invention relates to graphite products or bodies which are outstandingly useful in nuclear reactors as moderators or reflectors.

The graphite products according to the invention are very suitable for use in nuclear reactors in which the fissionable material, e.g. uranium oxide or uranium carbide, or plutonium, or a fertile material and the moderating graphite are arranged in the reaction chamber and the heat generated therein is removed.

The graphite products prepared according to the invention may not only be used as a moderator right in the reaction zone, as containers for fuel elements, or fuel elements themselves, but also as materials for a reflector mantle surrounding the reaction zone in nuclear reactors and serving to reflect some of the neutrons leaving the reaction zone. In any case the graphite bodies may be said to be in the "flux zone" of said nuclear reactors since they are contacted by or acted upon by the neutrons.

In these, and other possible instances, it is desirable to employ the graphite bodies in the form of plates, blocks, or tubes, or spheres typically ½ inch in diameter or larger or in the form of other shaped pieces, viz. as what may be termed as "massive structural" bodies, rather than small particles or powders.

Such shaped pieces are made by pressing or molding or shaping a mixture of a binder and a particularly suitable carbonaceous material, to be described in more detail hereinafter, into the desired size and shape, followed by baking and graphitizing procedures.

In all instances the arrangement of the crystallites in the graphitized bodies of the present invention is in a highly disordered unoriented, state. This condition is manifested by the isotropy in the properties of the finished piece. The unique carbonaceous material employed in the making of the graphitized bodies is also substantially isotropic on a microscale. The disordered arrangement of the crystallites in the carbonaceous material can be determined by X-ray diffraction and magnetic techniques and is manifested in the graphitized bodies by high coefficients of thermal expansion.

It is a finding of this invention that shaped and graphitized bodies characterized by such a disordered, unoriented crystallite arrangement and prepared by using the designated starting material as is described in more detail hereinafter, are very suitable when used in nuclear reactors, particularly at temperatures in excess of 500° C. in high temperature nuclear reactors, and offer several advantages (most of which accrue from their dimensional stability under neutron irradiation) over the employment in the same environment of graphite bodies prepared from different starting materials.

The unique and particularly suitable carbonaceous material being referred to and which may be employed in the present invention is derived from gilsonite, which is one of the purest (typically 99% soluble in carbon disulfide) natural bitumens, also typically containing only a trace of 1% mineral matter. Gilsonite has also been referred to as a black, solid hydrocarbon with a high resin content, or as an asphaltite believed to have been formed by polymerization of oil originating in tertiary shales which underlie the deposits. Gilsonite is also called uintaite or uintahite and is found in the United States, in Utah and Colorado. It generally possesses a specific gravity of from about 1.01 to 1.10, 60°/60° F., a hardness (Moh's scale) of about 2, and a melting point of about 230 to 400° F.

Coke produced from gilsonite is unique and the crystallites which comprise the coke are in an unoriented or disordered state. Raw gilsonite coke, therefore, requires no special treatment to bring the crystallites into this state of disorder before it is calcined. In other words the only procedures typically carried out are that the raw or green gilsonite coke is calcined, milled and sized before it is mixed with a suitable carbonaceous binder or bonding agent. The mixture is then formed, baked, and graphitized according to procedures conventional in the carbon and graphite electrode arts. About 20% to about 40% of a conventional carbonaceous binder such as pitch may typically be employed.

The raw or green coke produced from gilsonite is generally made using a conventional delayed coker and typically possesses about 8–14% volatile matter content, depending on coking unit operation. (The volatile matter being discussed here is determined by ASTM method D 271–48 modified for "sparking fuels" and is exclusive of the moisture and free oil which would be removed by heating to temperatures of 400–500° F. Volatile matter is determined in a platinum crucible in an electrically heated furnace maintained at temperatures of 1742° F.± 36° F. A one gram sample of dry −60 mesh coke is preheated at temperatures below 1742° F. and then kept at a temperature of 1742° F.±36° F. for 6 minutes and the resulting weight-loss is termed volatile matter.) When calcined, its volatile matter content is typically reduced to 0.5% or less.

The findings of this invention will become clearer after a consideration of the following examples.

EXAMPLE I

One hundred parts of calcined gilsonite cake flour (50% minus 200 mesh-Tyler) were mixed in a mix-muller at 155° C. for about 30 minutes with 23 parts of petroleum pitch binder (softening point 96° C.) and the mixture was then placed in a cylindrical mold and shaped at 100° C. under 1600 p.s.i. pressure into a cylinder 4 inches in diameter and 12 inches long.

The formed body was then placed in a baking furnace, surrounded by packing material, and heated to a temperature of 950° C. over a period of 10 days. After cooling, the baked body was placed in a graphitizing furnace and heated to a temperature in excess of 2500° C. over a period of 40 hours.

The coefficients of thermal expansion of this graphitized body in the X, Y and Z directions were determined by cutting specimens parallel to the molding force (X direction) and in two directions at 90° to each other in a plane perpendicular to the molding force (Y and Z directions). The respective mean coefficients of thermal expansion measured over the temperature range of 20° C. to 100° C. were:

X—$49 \times 10^{-7}$ inches/inch/° C. or inch/inch/° C.
Y—$42 \times 10^{-7}$ inches/inch/° C.
Z—$42 \times 10^{-7}$ inches/inch/° C.

Specimens from this sample were inserted in a nuclear reactor to test their dimensional stability under nuclear irradiation. The specimens were irradiated at a temperature of about 650° C. and each subjected to a total exposure of 1789 Mwd/At [(megowatt days per adjacent ton) (cf. "Nuclear Graphite" published by Academic Press, 1962, Chapter Eight on Radiation Techniques Employed)]. Their dimensional changes were then measured to determine the percent changes in the directions parallel and transverse to the direction of the molding force. Following are the results:

| Direction: | Average Percent Length Change |
|---|---|
| Parallel | +0.017±0.008 |
| Transverse | +0.007±0.004 |

This example shows that graphitized bodies, prepared from calcined gilsonite coke flour and a carbonaceous binder, have very good dimensional stability and undergo very little dimensional change in any direction during irradiation.

In contrast to the foregoing example, specimen graphite bodies prepared from 100 parts of commercially available calcined petroleum coke flour (50%—200 mesh-Tyler) thoroughly mixed with 23 parts of petroleum pitch binder and extruded at 100° C. and 1600 p.s.i. into a cylinder four inches in diameter and twelve inches long, and baked and graphitized as in Example I, possessed mean CTE's (over the temperature range of 20–100° C.) of $10 \times 10^{-7}$, $25 \times 10^{-7}$ and $25 \times 10^{-7}$, respectively, in the X, Y and Z directions and underwent the following dimensional changes when tested under the same conditions:

| Direction: | Average Percent Length Change |
|---|---|
| Parallel | +0.017±0.008 |
| Transverse | +0.056±0.019 |

Besides the differences in isotropy (or anisotropy) between the two types of bodies, this data shows that graphitized bodies prepared from calcined gilsonite coke flour and a carbonaceous binder offer considerably improved dimensional stability under irradiation or resistance to radiation damage over graphite bodies prepared from a typical petroleum coke starting material.

The following example also shows the production of a graphitized body from calcined gilsonite coke, and is set forth to illustrate processing variations as well as additional properties possessed by the graphitized bodies used in the present invention.

EXAMPLE II

One hundred parts of calcined gilsonite coke flour (55% minus 200 mesh-Tyler) were mixed in a mixmuller at 155° C. for about 30 minutes with 27 parts of coal tar pitch binder (softening point 97° C.) and the mixture was then placed in a cylindrical mold and shaped at 105° C. under 3600 p.s.i pressure into a cylinder 8.5 inches in diameter and 10 inches long.

The formed body was then placed in a baking furnace, surrounded by a thermal conducting packing material, and heated to a temperature of 950° C. over a period of 16 days. After cooling, the baked body was placed in a graphitizing furnace and heated to a temperature in excess of 2500° C. over a period of 40 hours.

The mean CTE's of the graphitized body (over the temperature range of 20–100° C.) in the X, Y and Z directions were $49 \times 10^{-7}$, $43 \times 10^{-7}$ and $43 \times 10^{-7}$ respectively.

The graphitized body also possessed the following additional properties:

| | |
|---|---|
| Apparent density (g./cc.) | 1.73 |
| Tensile strength, p.s.i.: | |
| Transverse | 3700 |
| Parallel | 3000 |
| Modulus of rupture, p.s.i. (Flexural strength): | |
| Transverse | 5200 |
| Parallel | 4400 |
| Compressive strength, p.s.i. | |
| Transverse | 10,500 |
| Parallel | 10,800 |
| Electrical resistivity, ohm-in.: | |
| Transverse | $43 \times 10^{-5}$ |
| Parallel | $49 \times 10^{-5}$ |
| Thermal conductivity (B.t.u./hr./ft.$^2$/ft/° F.): | |
| Transverse | 69 |
| Parallel | 60 |
| Hardness, Brinell | 15.0 |
| Permeability, D'arcy: | |
| Transverse | .06 |
| Parallel | .02 |

Transverse—Test specimens cut with their long dimension transverse or perpendicular to the direction of molding.
Parallel—Test specimens cut with their long dimension parallel with the direction of molding.

Bodies derived from gilsonite having coefficients of thermal expansion in any direction of at least $30 \times 10^{-7}$ inch/inch/° C. and in which the said coefficients in any direction do not differ by more than 25% are operative for bringing about improved dimensional stability or resistance to radiation damage in nuclear reactors. Bodies with more perfect isotropy, however, are preferred, such as bodies which have coefficients of thermal expansion in any direction of at least $40 \times 10^{-7}$ inch/inch/° C. and in which said CTE's do not differ in any direction by more than 20%.

Dimensional stability of graphite bodies employed in nuclear reactors is important for several reasons. In many cases the mass of graphite in reactors is very large, with dimensions in excess of 30 or 40 feet, in which event a slight or even very slight percentage dimensional change results in a relatively great overall absolute change. Dimensional instability such as too much "growth" or "shrinkage" may also cause rupture of the graphite structural members, or break or bend the fuel elements or other component parts. Such phenomena can also cause breakage or jamming of parts and damage to the cooling system, control system, etc.

Our co-pending application Ser. No. 266,088 filed Mar. 18, 1963, now U.S. Patent No. 3,245,880 relates to the use of specially derived substantially isotropic graphitized bodies for use in nuclear reactors. In said application it was shown that cokes in which the crystallites are highly disordered or unoriented are very useful in the production of high CTE isotropic graphitized bodies which are dimensionally stable under neutron irradiation in nuclear reactors, particularly at high temperatures. Because the crystallities in gilsonite coke are in an unoriented or disordered state, and no special treatment is required to achieve this condition before the coke is calcined (as is necessary for the rest of the materials of the S.N. 266,088 application), and also because of the specifically unique nature of gilsonite, and graphite bodies prepared from same, it was decided that the inventions were distinct and that an independent application on gilsonite-derived graphitized bodies was necessary and proper. The high purity of the gilsonite in its raw state and the fact that gilsonite coke requires no special preliminary treatment in order to make suitable bodies are distinct advantages for using this material for the purposes set forth in this application.

It is to be understood that the invention is not limited to the specific examples which have been offered merely as illustrative and that modifications may be made within the scope of the appended claims without departing from the spirit of the invention.

We claim:

1. In the process of operating a nuclear reactor, the steps comprising creating a nuclear reaction and thereby effecting a neutron flux, and moderating or reflecting the neutrons by placing in the path of said neutrons formed and graphitized bodies derived mainly from cokes produced from gilsonite.

2. In the process of operating a nuclear reactor, the steps comprising creating a nuclear reaction and thereby effecting a neutron flux, and moderating or reflecting the neutrons by placing in the path of said neutrons formed and graphitized, massive structural, substantially isotropic bodies in which the arrangement of the crystallites is highly disordered and unoriented, the carbonaceous raw material for said bodies being derived mainly from cokes produced from gilsonite, said substantially isotropic bodies being characterized by having coefficients of thermal expansion in any direction of at least $30 \times 10^{-7}$ inch/inch/° C., measured over the temperature range of 20° C. to 100° C., said coefficients of thermal expansion in any direction not differing by more than 25%.

3. In the process of operating a nuclear reactor, the steps comprising creating a nuclear reaction and thereby effecting a neutron flux, and moderating or reflecting the neutrons by placing in the path of said neutrons formed and graphitized, massive structural, substantially isotropic bodies in which the arrangement of the crystallites is highly disordered and unoriented, the carbonaceous raw material for said bodies being derived mainly from cokes produced from gilsonite, said substantially isotropic bodies being characterized by having coefficients of thermal expansion in any direction of at least $40 \times 10^{-7}$ inch/inch/° C., measured over the temperature range of 20° C. to 100° C., said coefficients of thermal expansion in any direction not differing by more than 20%.

4. In the process of operating a nuclear reactor, the steps comprising creating a nuclear reaction and thereby effecting a neutron flux, and moderating or reflecting the nuetrons by placing in the path of said neutrons reactor components fabricated from graphite derived substantially from gilsonite.

5. A process according to claim 4 in which the reactor components fabricated from graphite are at temperatures in excess of 500° C. when subjected to the neutron flux.

References Cited by the Examiner

UNITED STATES PATENTS

| | | | |
|---|---|---|---|
| 3,186,913 | 6/1965 | Weisner et al. | 176—41 X |
| 3,203,906 | 8/1965 | Evans et al. | 252—478 |

CARL D. QUARFORTH, *Primary Examiner.*

LEON D. ROSDOL, *Examiner.*

L. A. SEBASTIAN, *Assistant Examiner.*